Jan. 19, 1932. P. G. BENNETT 1,842,239
GRANDSTAND FOR RACE TRACKS
Filed Dec. 19, 1928
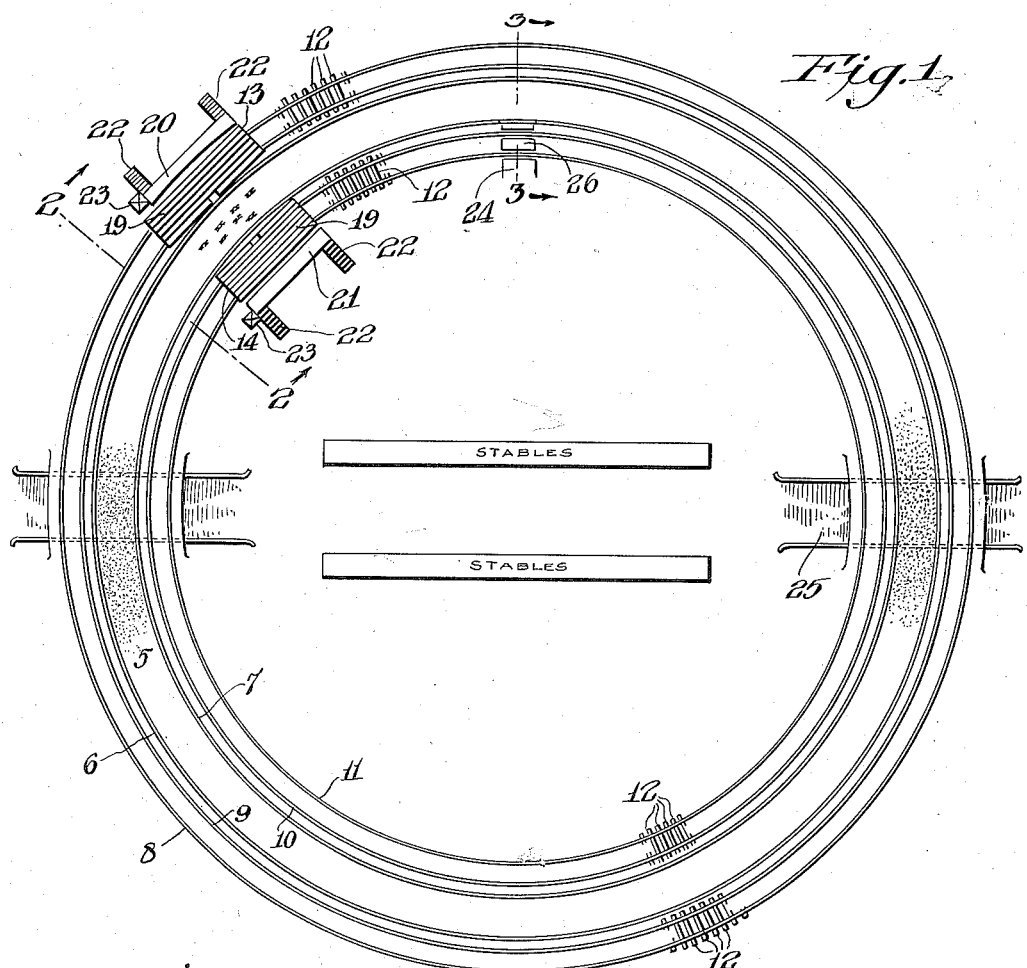
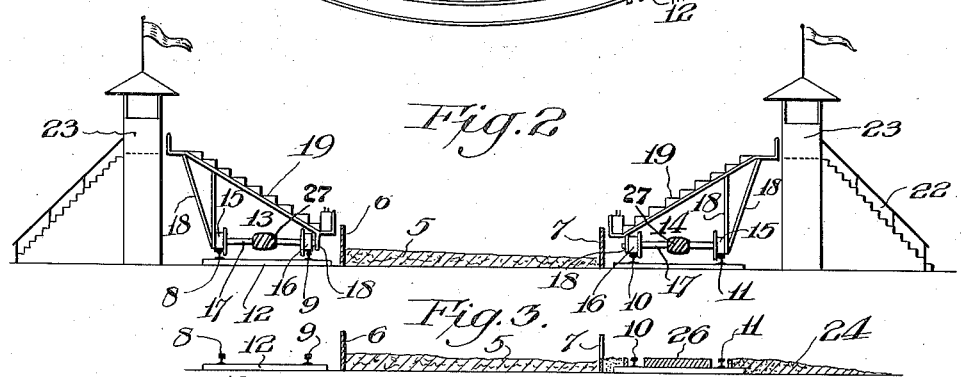
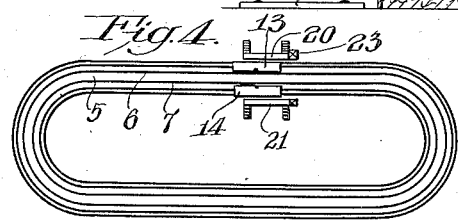
Inventor
Paul G. Bennett,
By Leonard L. Kalish
Attorney.

Patented Jan. 19, 1932

1,842,239

UNITED STATES PATENT OFFICE

PAUL G. BENNETT, OF PHILADELPHIA, PENNSYLVANIA

GRANDSTAND FOR RACE TRACKS

Application filed December 19, 1928. Serial No. 326,993.

My invention relates to a new and useful improvement in a grand-stand for race tracks, and it relates more particularly to a novel construction wherein the grand-stand may be moved parallel to the race track by suitable propelling means so that it may be constantly abreast of the racers at any particular part of the race track.

In the conventional race tracks employed at present and heretofore, the spectator in the grand-stand is able to observe and follow the racers only over a small part of the race track, since at other parts the racers are either too far away to be observed closely or are at such a direction with respect to the grand-stand that they cannot be accurately observed.

It is the object of my present invention to provide a railway parallel to the race track either on the inside or on the outside of the track, or both, and then to mount one or more grand-stands upon such railways, supported upon suitable sets of wheels and having suitable means for propelling said grand-stands at any desired speed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings in which like reference characters indicate like parts, Figure 1 represents a top plan view of a race track embodying my invention.

Figure 2 represents a section on line 2—2 of Figure 1, on an enlarged scale.

Figure 3 represents a section on line 3—3 of Figure 1, on a similarly enlarged scale.

Figure 4 represents a top plan view of a race track embodying my invention as applied to an oblong or oval shaped track.

In carrying out my invention I may build the race track either circular or oval or elliptical, as may be desirable. The race track 5 may be built up in any suitable manner and is preferably provided with outer and inner border guard rails 6 and 7, respectively. Immediately adjacent the outer and inner borders of the bed of the track 5 I provide pairs of parallel sets of rails 8 and 9, and 10 and 11, respectively, mounted upon suitable ties 12 or other suitable foundation or support.

The grand-stands 13 and 14 may be built up of structural steel in any suitable manner, and are mounted upon pairs of wheels 15 and 16 carried upon suitable axles 17 which are journalled in the frame structure 18 of the stand in any suitable manner.

On top of the frame structure 18 the seats 19 are provided.

The grand-stands may thus be propelled alongside of or parallel to the race track. The propelling means may be any suitable drive and the source of power may be any suitable electrical motor 27 or any suitable gasoline engine or the like. If it is desirable, the grand-stands may be propelled by suitable cable drive. In the drawings I have not illustrated the particular driving means and source of power as this may be any conventional means.

At a suitable point on the track, preferably at the starting point, landing platforms 20 and 21 are provided at a height corresponding to the top of the grand-stands 13 and 14 and with suitable stairs 22 leading thereto. These landing platforms may be arranged immediately alongside the judges' stand 23.

At suitable points along the track, crossings may be provided over the railways by making suitable inclined approaches 24 and 25 outside and inside of the track and by suitably filling in the bed 26 of the railway. This is for the purpose of enabling the spectators to conveniently cross the railways and also for enabling the racers to cross said railways.

In Figure 4 I have illustrated, on a reduced scale, a similar embodiment of my invention applied to an oval or an elliptical track. My invention is applicable to race tracks both for horse races as well as dog races, or other races. In either event it is the object of my invention to enable the spectators closely to observe the entire race from beginning to finish by enabling the spectators always to be abreast of the racers.

In practice, the grand-stands are preferably provided with variable speed propelling means so that the operator on the grand-stand may control the speed of the grand-stand to correspond to the racers in the lead.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. The combination of an endless race track, a railway adjacent and generally parallel thereto, a grand-stand movably mounted upon said railway upon suitable wheels, means to propel said railway and a landing platform at a suitable point alongside of said railway on the side farthest from said race track and leading to the top of said grand-stand.

2. The combination of an endless race track, an endless railway adjacent and generally parallel thereto on the inside thereof and a railway adjacent and generally parallel thereto on the outside thereof, a grand-stand movably mounted upon each of said railways upon suitable wheels, means to propel each of said railways at variable speed and a landing platform at a suitable point alongside of each of said railways and in operative alignment with said respective grand-stands, said landing platform being disposed on the side of the respective railways farthest from said race track.

3. The combination of an endless race track, an endless railway adjacent and generally parallel thereto, on the inside thereof and a railway adjacent and generally parallel thereto on the outside thereof, a grand-stand movably mounted upon each of said railways upon suitable wheels, means to propel each of said railways at variable speed and a landing platform at a suitable point alongside of each of said railways and in operative alignment with said respective grand-stands, said landing platforms being disposed on the side of the respective railways farthest from said race track;— said landing platforms leading to the top of said grand-stands.

4. The combination of an endless race track, a railway adjacent and generally parallel thereto, a grand-stand movably mounted upon said railway upon suitable wheels, means to propel said railway and a landing platform at a suitable point alongside of said railway on the side farthest from said race track and leading to the top of said grand-stand, and a judges' stand adjacent the path of travel of said grand-stand and disposed outside of said path of travel.

In testimony whereof, I have hereunto set my hand and seal.

PAUL G. BENNETT.